(12) United States Patent
Ory

(10) Patent No.: US 8,657,328 B2
(45) Date of Patent: Feb. 25, 2014

(54) ARRANGEMENT OF AN INFLATABLE AIRBAG IN AN INSTRUMENT PANEL COMPRISING A FLAP CONNECTED TO THE INSTRUMENT PANEL BY A LINEAR TETHER

(75) Inventor: Daniel Ory, Le Plessis-Bouchard (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 13/636,682

(22) PCT Filed: Mar. 23, 2011

(86) PCT No.: PCT/EP2011/001444
§ 371 (c)(1),
(2), (4) Date: Dec. 3, 2012

(87) PCT Pub. No.: WO2011/116950
PCT Pub. Date: Sep. 29, 2011

(65) Prior Publication Data
US 2013/0127139 A1    May 23, 2013

(30) Foreign Application Priority Data
Mar. 24, 2010 (FR) ..................................... 10 52137

(51) Int. Cl.
*B60R 21/216* (2011.01)
*B60R 21/205* (2011.01)
(52) U.S. Cl.
USPC ...................................... 280/728.3; 280/743.2
(58) Field of Classification Search
USPC .......................................... 280/728.3, 743.2
See application file for complete search history.

(56) References Cited

U.S. PATENT DOCUMENTS

| | | | |
|---|---|---|---|
| 5,306,042 A | 4/1994 | Frank | |
| 5,398,960 A | 3/1995 | Ravenberg | |
| 5,472,228 A * | 12/1995 | Bentley et al. | ............. 280/728.3 |
| 5,533,746 A * | 7/1996 | Whited | ...................... 280/728.2 |
| 6,053,527 A | 4/2000 | Gans et al. | |

(Continued)

FOREIGN PATENT DOCUMENTS

| | | |
|---|---|---|
| DE | 102008039552 | 3/2010 |
| EP | 0695671 | 2/1996 |
| JP | 8091163 | 4/1996 |

OTHER PUBLICATIONS

International Search Report for PCT/EP2011/001444 dated Jun. 29, 2011, 3 pages (translated).

*Primary Examiner* — Drew Brown
(74) *Attorney, Agent, or Firm* — Reising Ethington P.C.

(57) ABSTRACT

The invention relates to an inflatable airbag arrangement (1) comprising an instrument panel body (2) having an aperture (3), a flap (10) closing this aperture (10) while being articulated to a transverse articulation edge of this aperture, a firing canal (4) fixed on the underside face of the instrument panel body (2). At least one tether (18) is fixed to the flap (10) and to the firing canal (4) so as to form a hinge and/or so as to limit the opening of the flap (10), and the firing canal (4) comprises at least one opening (28, 29, 42) establishing communication between an internal face and an external face of an edge (8, 9, 6) of the firing canal (4). The tether (18) passes through this opening (28, 29, 42) to be fixed while being held firmly at an external face of the firing canal (4) when the flap (10) opens.

6 Claims, 2 Drawing Sheets

(56) References Cited

U.S. PATENT DOCUMENTS

| | | | |
|---|---|---|---|
| 7,118,123 B2 * | 10/2006 | Weissert et al. | 280/728.3 |
| 8,376,395 B2 * | 2/2013 | Ory | 280/728.3 |
| 8,500,158 B2 * | 8/2013 | Ory | 280/728.3 |
| 2003/0020269 A1 | 1/2003 | Muhlbach | |
| 2003/0184058 A1 | 10/2003 | Gray et al. | |
| 2003/0184063 A1 | 10/2003 | Yasuda | |
| 2005/0127642 A1 | 6/2005 | Weissert et al. | |
| 2005/0167953 A1 | 8/2005 | Weissert | |
| 2007/0080521 A1 * | 4/2007 | Leserre et al. | 280/728.3 |
| 2008/0012273 A1 | 1/2008 | Cowelchuk | |

* cited by examiner

ARRANGEMENT OF AN INFLATABLE AIRBAG IN AN INSTRUMENT PANEL COMPRISING A FLAP CONNECTED TO THE INSTRUMENT PANEL BY A LINEAR TETHER The invention relates to an arrangement of an inflatable airbag in a motor vehicle instrument panel body, this airbag for example being positioned to afford frontal protection to an occupant of the vehicle seated beside the driver of this vehicle.

BACKGROUND OF THE INVENTION

In such an arrangement, the instrument panel body is provided with an aperture which is closed at its top face by a flap, and with a firing canal fixed on the underside face of the instrument panel body while surrounding the aperture.

The firing canal has an upper face which conforms to the curved shape of the instrument panel body, and an underside face which is generally flat and to which an airbag module of standardized type is fixed.

When the airbag inflates, it passes through the firing canal to come to press against the underside face of the flap, thus causing the flap to open. The airbag then passes through the aperture in the instrument panel body to deploy in the passenger compartment of the vehicle in order to protect the occupants thereof.

In general, the aperture has a rectangular outline and the flap is articulated around the transverse edge of this aperture which is furthest forward in relation to the direction of forward travel of the vehicle, i.e. the one closest to the windshield.

Given the speed with which the flap opens, the flap may shatter against the windshield during the opening brought about by the inflation of the airbag. This shattering may result in flap debris being thrown out in the direction of the occupants of the vehicle, this being liable to injure the occupants.

In order to overcome this disadvantage, document US2005127642 teaches the provision of lateral tethers securing each lateral edge of the flap to the corresponding lateral edge of the aperture, these tethers being slack when the flap is closed. The opening of the flap is therefore limited by the lateral retaining tethers which become taut when the airbag inflates, thus ensuring that the flap cannot strike the windshield.

The loads that arise at the time of opening are great because of the speed of deployment which is desirable for the airbag which means that the mechanical strength of the retaining tethers is generally insufficient. In practice, the tethers have a tendency to become torn out of the instrument panel body, damaging the flap and thereby creating a risk of debris being thrown out in the direction of the occupants of the vehicle.

OBJECT OF THE INVENTION

The object of the invention is to propose a solution to overcome these disadvantages.

SUMMARY OF THE INVENTION

To this end, one subject of the invention is an arrangement of a motor vehicle instrument panel inflatable airbag comprising an instrument panel body having an aperture for the passage of an inflatable airbag, a flap closing this aperture and articulated to a transverse articulation edge of this aperture, a firing canal fixed on the underside face of the instrument panel body and forming a surround surrounding the aperture, this firing canal having a flat lower face intended to accept an inflatable airbag module, characterized in that it comprises at least one tether fixed to the flap and to the firing canal to form a hinge and/or to limit the opening of the flap, in that the firing canal comprises at least one opening oriented radially with respect to the aperture so as to establish communication between an internal face and an external face of an edge of the firing canal, and in that the tether passes radially through this opening so as to be fixed while firmly retained at an external face of the firing canal when the flap opens subsequent to the inflation of the airbag.

With this solution, the tether is fixed to the rest of the instrument panel body in a very firm way because the firing canal has better mechanical integrity than the instrument panel body.

Another subject of the invention is an arrangement as defined hereinabove, in which in which the firing canal comprises openings in the form of slots open in the upper face of the firing canal and/or openings in the form of notches open in the lower face of the firing canal.

The notch-shaped openings or slot-shaped openings opening into an upper or lower face of the firing canal make it easier to fit the tether and notably allow the use of a tether that forms a closed loop.

Another subject of the invention is an arrangement as defined hereinabove, in which the firing canal comprises, at its lateral edges, slots each having a neck opening into the upper face of the firing canal and a body of the opening which is connected to the neck and is of dimensions greater than those of the neck, the body of the opening being offset in relation to the neck toward the articulation edge of the flap, and at least one tether secured to the flap and having a portion which passes radially through a slot to be held firmly at the external face of the firing canal in order to constitute a tether portion that limits the opening of the flap.

Another subject of the invention is an arrangement as defined hereinabove, in which the firing canal comprises a lateral edge provided with two slots and in which the tether locally forms a loop that passes radially through the firing canal at these two slots while held by the external face portion of the firing canal that is situated between the two slots.

Another subject of the invention is an arrangement as defined hereinabove, in which the firing canal comprises an edge running alongside the articulation edge of the flap, this edge being provided with one or more notches opening into the lower face of the firing canal and comprising at least one tether secured to the flap and passing radially through the notch while being held at the external face of the firing canal in order to constitute an articulation of the flap to the instrument panel body.

Another subject of the invention is an arrangement as described hereinabove, in which the edge of the firing canal that runs alongside the articulation edge of the flap comprises at least two notches, and a tether that locally forms a loop passing radially through the firing canal at two notches while being held by the external face portion of the firing canal that is situated between these two notches so as to constitute an articulation of the flap to the instrument panel body.

DETAILED DESCRIPTION OF THE INVENTION

The idea underlying the invention is that of profiting from the firing canal of such an arrangement to form firm anchor points for the tethers that connect the flap to the rest of the instrument panel.

Figure 1:
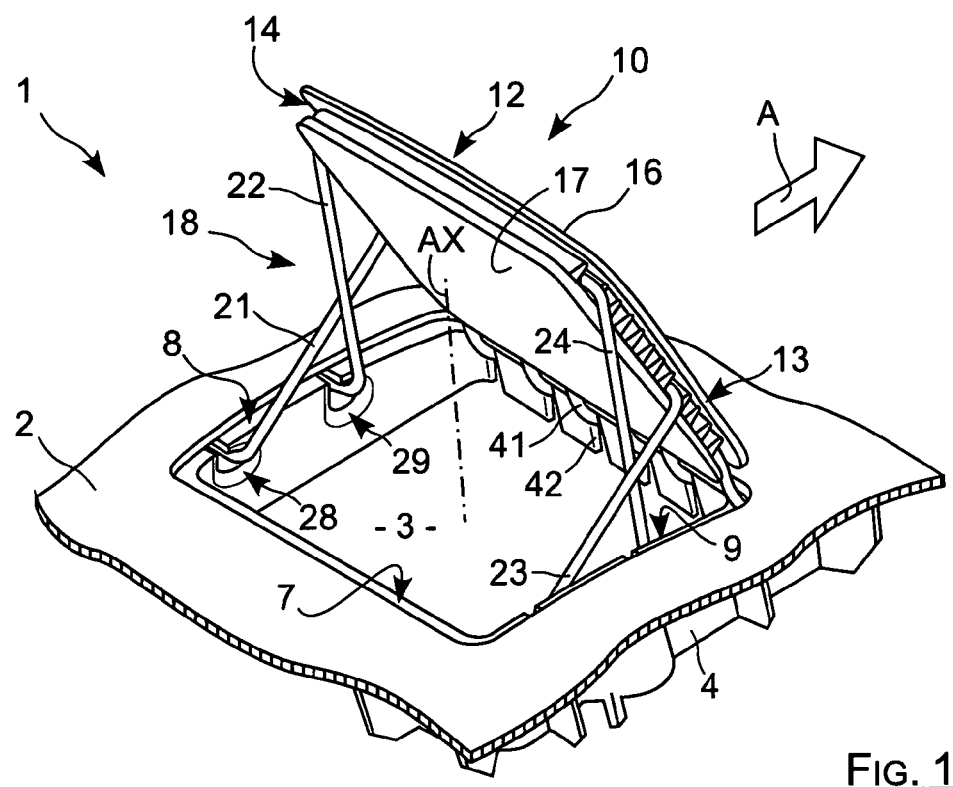
FIG. 1 is a perspective view showing the arrangement according to the invention when the flap is open.
Figure 2:
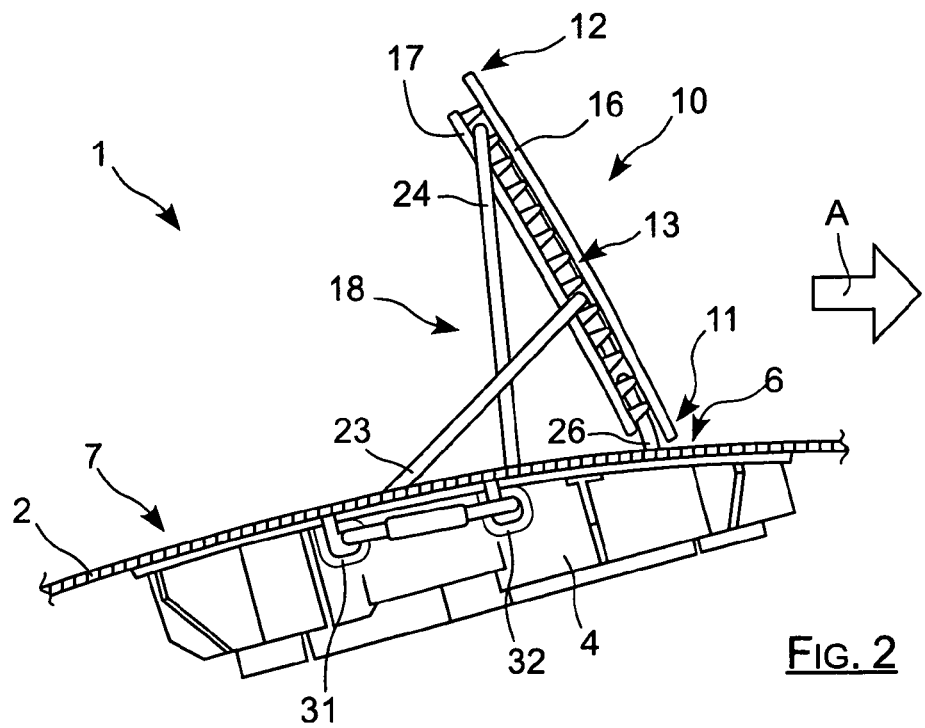
FIG. 2 is a lateral view of the arrangement according to the invention when the flap is open.

As visible in FIG. 1, the arrangement according to the invention, identified overall by 1, is incorporated into an instrument panel that comprises an instrument panel body with the general reference 2 having a rectangular aperture 3 for the passage of an airbag, not depicted.

A firing canal with the general reference 4 which likewise has a generally rectangular internal outline, is fixed on the underside face of the instrument panel body 2 in such a way as to surround the aperture 3.

The aperture 3 and the firing canal 4 together delimit a rectangular outline comprising a front transverse edge 6, in relation to the direction of forward travel A of the vehicle, and a rear transverse edge 7 opposite the front edge 6. The two lateral edges of this outline, which are identified by 8 and 9, run more or less parallel to the direction A.

The aperture 3 is closed by a flap 10, likewise rectangular, comprising a front transverse edge 11, a rear transverse edge 12, and two lateral edges 13 and 14. The front transverse edge 11 of the flap is articulated to the front transverse edge 6 of the aperture to open when the airbag inflates.

As can be seen in the figures, the flap 10 comprises a wall 16 which runs in the continuation of the instrument panel body 2 when the flap is closed, and a plate 17 fixed to the underside face of this wall 16.

The plate 17 has a substantially flat underside face but on the other hand has a series of transverse and longitudinal ribs protruding from its upper face. The plate 17 is fixed to the wall 16 for example by ultrasound welding or the like, so that it is the protruding edge faces of the ribs which are secured to the underside face of the wall 16.

Thus there is a space between the generally flat body of the plate 17 and the underside face of the wall 16, this space being delimited by the various transverse and longitudinal ribs which thus form canals situated between the plate body 17 and the wall 16.

As visible in the figure, a linear tether with the general reference 18 is fixed to the flap 10 and to the instrument panel body 2. This tether has two lateral holding portions 21 and 22 which connect the lateral edges 9 to 13 and two other lateral portions 23 and 24 which connect the lateral edges and 8 to 14 to limit the opening of the flap 10.

To complement this, this tether 18 also comprises an articulation portion 26 which passes through the transverse edges 6 and 11 of the aperture 3 and of the flap 10 to form or reinforce the articulation of this flap 10 to the rest of the instrument panel.

The tether 18 is fixed to the flap 10 by being fitted between the transverse ribs of the plate 17, so that it is thus trapped between the body of the plate 17 and the wall 16 while at the same time being held by the ribs separating these two elements, these ribs advantageously having shapes and dimensions suited to holding this tether firmly.

In the example of the figures, the tether 18 extends from the lateral portion 22 to the lateral portion 24 being engaged in a groove delimited by two transverse ribs of the plate 17. The two lateral portions 21 and 23 are also engaged between consecutive ribs of the plate 17 and, between the plate 17 and the wall 16, they follow paths that lead them toward the articulation edge 11 of the flap to constitute articulation portions 26 of this tether 18.

As can be seen in the figures, the lateral edge 8 of the firing canal 4 comprises two openings 28 and 29 passing through this edge 8 radially with respect to an axis AX normal to the aperture 3 and centered thereon. Each opening 28, 29 is a slot which passes radially through the edge 8 of the firing canal 4 to establish communication between an internal face and an external face of this edge 8 of the firing canal 4 and which in addition also opens onto the upper face of the firing canal, i.e. the face via which this firing canal is fixed to the underside face of the instrument panel body 2.

The retaining portions 21 and 22 of the tether 18 are fixed to the lateral edge 8 of the firing canal 4 while being respectively engaged in the slot 28 and in the slot 29, locally forming a loop which passes through the edge 8. That portion of this loop that connects the portions 21 and 22 thus presses against that portion of the external face of the edge 8 of the canal 4 which is situated between the two slots 28 and 29.

Similarly, the retaining portions 23 and 24 of the tether 18, which connect the lateral edges 13 and 9 are fixed to the instrument panel while being engaged in two other slots 31 and 32 that pass radially through the edge 9 of the firing canal to establish communication between the internal face and the external face of this edge while opening onto the upper face of the firing canal 4.

Figure 3:
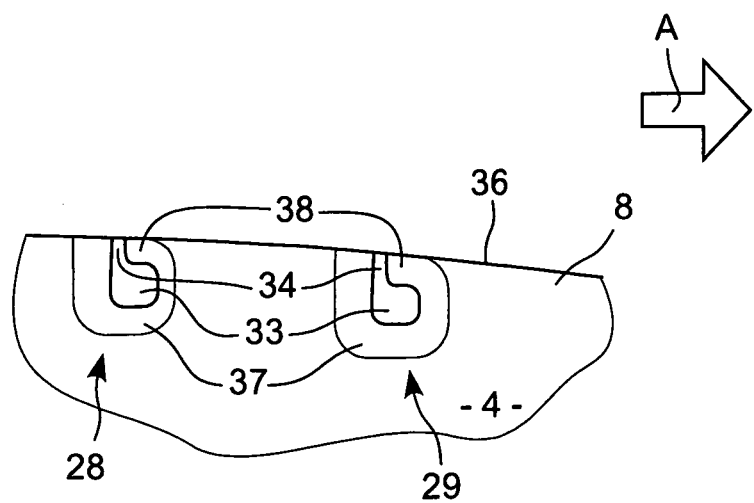
FIG. 3 is a detailed view showing the slots of the arrangement according to the invention with no tethers fitted.

As is more clearly visible in FIG. 3, each slot 28, 29 comprises firstly a body 33 of the opening with dimensions greater than the diameter of the tether 18 and a neck 34 of dimensions very similar to the diameter of the tether 18, and via which the slot 28 opens into the upper face 36 of the firing canal 4.

Figure 4:
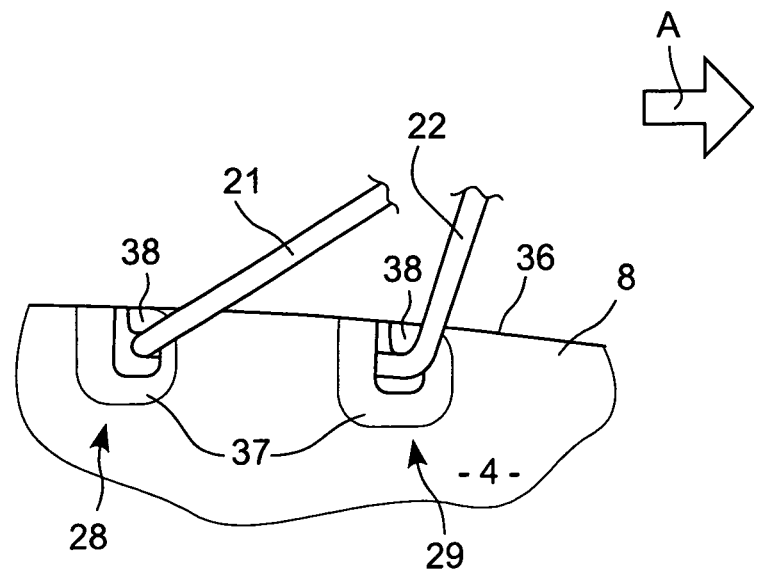
FIG. 4 is a detailed view showing the slots of the arrangement according to the invention when tether portions that have become taut as a result of the opening of the flap are passing through them.

As can be seen in the figures, in each of the slots 28, 29, the main opening 33 is offset toward the front of the vehicle, i.e. towards the articulation edge 6, in relation to the neck 34. This offsetting makes it possible in the upper part of each slot to define a projection that forms a spur or a hook 38, formed in the rigid material of the firing canal 4 and against which the tether 18 presses when the flap 10 opens, this situation being depicted in FIG. 4.

At the same time, the inner and outer edges of the slots 28 and 29 are softened. Each of these edges 37, which corresponds to the meeting point of the internal surface delimited by a slot and the internal or external surface of the edge 8 of the firing canal 4 is softened so that it has a radius of curvature of the order of the radius or of the diameter of the linear tether, as opposed to having a sharp-edged profile.

This being so, when the retaining portions of the tether 18 are suddenly placed under tension because of the opening of the flap, the risk of this tether 18 breaking at the slots is almost eliminated because the tether is then pressing against a curved surface referenced 37 in the figures.

As will have been appreciated, the slots 31 and 32 in the edge 9 of the firing canal 4, which accept the retaining tether lateral portions 23 and 24, have the same shapes and layouts as the slots 28 and 29, and offer the same advantages.

The slots in which the retaining portions of the tether 18 are engaged are made from the material of the firing canal 4 which has better mechanical integrity than the instrument panel body 2, which means that they hold the tether 18 firmly as the flap 10 opens, without the risk of being torn out.

The fact that these slots 28, 29, 31, 32 open onto the upper face of the firing canal 4 makes it easier for the retaining tether portions 21, 22, 23, 24 to be engaged: the two loops formed locally by, on the one hand, the portions 21 and 22 and, on the other hand, the portions 23 and 24 can be engaged via the upper face 36 of the firing canal, before this canal 4 is assembled with the underside face of the instrument panel body, thus simplifying the manufacturing process.

The choice of slots with necks 34 of dimensions appreciably smaller than the diameter of the tether 18 ensures that once the tether 18 has been engaged in these openings there is no risk of its being inadvertently disengaged.

As mentioned earlier, the tether 18 has an articulation portion 26 formed in a series of loops protruding beyond the articulation edge 11 of the flap 10 and uniformly spaced apart.

The strands of these loops are depicted in FIG. 1 and referenced 41 therein, and they are each engaged in a corresponding notch, these notches being identified as 42. Each notch 42 is made in the front edge 6 of the firing canal 4, and has a straight overall shape directed vertically and opening into the flat underside face of the firing canal 4.

When the assembly is installed, as in FIG. 1, each loop of the articulation portion 26 of the tether 18 surrounds a portion of the front edge 6 of the firing canal in such a way as to press against that portion of the external face of this canal that separates two consecutive notches.

Just as was the case of the lateral tether portions, the notches hold the tether 18 firmly and as a result the opening of the flap can occur with no risk of this flap being destroyed or torn out.

In the example illustrated in the figures, the notches 42 open into the underside face of the firing canal are generally straight. These notches may just as well have shapes of the same type as the slots 28 and 29, comprising a body of the opening which is of large dimensions, connected to a neck of dimensions close to or appreciably smaller than the diameter of the tether, this neck opening into the underside face of the firing canal.

That being so, the openings 42 hold each strand 41 which is then retained vertically by the neck, preventing it from dropping down under the effect of its own weight and thereby coming out of the opening.

The flap 10 with the lateral tether portions and the articulation portions is advantageously installed before the firing canal is fixed to the instrument panel body 2. The tether 18 is, for example, fitted at the upper face of the plate 17, between the ribs provided for that purpose, in such a way as to form, on the one hand, the loops that protrude beyond the lateral edges to form the tether portions that hold onto the flap and, on the other hand, the loops that protrude beyond the articulation edge of the flap to form the hinge of this flap.

Advantageously, the ribs of the upper face of the plate 17 ensure are sufficiently close together to ensure that the tether is held temporarily, simply by being nestled in between the ribs.

The plate 17 is then offered up via the underside face of the firing canal to engage the loops of the tether 18 that form the articulation portion 26 of this tether in the corresponding notches of the front edge 6 of the firing canal 4.

Once this operation is complete, the flap can be held in the open position over the opening 3 so that the lateral loops of the tether can be slipped into the slots in the lateral edges of the firing canal. The lateral loops can then be pulled outward to take up the excess length of these loops and position it outside the firing canal so that there is no risk of its disturbing the opening of the flap. During this last operation, the flap spontaneously positions itself in its closed position.

The firing canal with the plate 17 can then be applied to the underside face of the instrument panel body 2 and fixed thereto, for example using an ultrasonic welding technique, or any other suitable method.

It should be noted that, in the example of the figures, use is made of a tether 18 which in general forms a single closed loop, its configuration forming two lateral loops and several loops in the region of the articulation edge.

The invention is just as applicable to a solution in which the tether used is not necessarily a closed loop.

In particular, the invention applies just as well to a solution in which there is just one lateral tether portion on each side of the flap for limiting the opening thereof. In such a case, the firing canal has just one slot in each of its lateral edges, and each retaining tether portion passes through this slot with its end fixed to the external face of the firing canal, for example at a fixing tab by by any other fixing means situated on the external face of the firing canal.

Similarly, the excess length of the tether is then pulled until it is on the external face of the firing canal when the flap is in the closed position so that this excess length will not disturb the opening of the flap.

The invention claimed is:

1. An arrangement of a motor vehicle instrument panel inflatable airbag comprising an instrument panel body having an aperture for the passage of an inflatable airbag, a flap closing this aperture and articulated to a transverse articulation edge of this aperture, characterized in that it comprises a firing canal fixed on the underside face of the instrument panel body and forming a surround surrounding the aperture, this firing canal having a flat lower face intended to accept an inflatable airbag module, at least one tether fixed to the flap and to the firing canal to form a hinge and/or to limit the opening of the flap, in that the firing canal comprises at least one opening oriented radially with respect to the aperture so as to establish communication between an internal face and an external face of an edge of the firing canal, and in that the tether passes radially through this opening so as to be fixed while firmly retained at an external face of the firing canal when the flap opens subsequent to the inflation of the airbag, and in that at least one opening through which the tether passes is in the form of a slot or a notch open in the upper face or in the lower face of the firing canal.

2. The arrangement as claimed in claim 1, in which the firing canal comprises openings in the form of slots open in the upper face of the firing canal and/or openings in the form of notches open in the lower face of the firing canal.

3. The arrangement as claimed in claim 1, in which the firing canal comprises, at its lateral edges, slots each having a neck opening into the upper face of the firing canal and a body of the opening which is connected to the neck and is of dimensions greater than those of the neck, the body of the opening being offset in relation to the neck toward the articulation edge of the flap, and at least one tether secured to the flap and having a portion with passes radially through a slot to be held firmly at the external face of the firing canal in order to constitute a tether portion that limits the opening of the flap.

4. The arrangement as claimed in claim 3, in which the firing canal comprises a lateral edge provided with two slots and in which the tether locally forms a loop that passes radially through the firing canal at these two slots while being held by the external face portion of the firing canal that is situated between the two slots.

5. The arrangement as claimed in claim 1, in which the firing canal comprises an edge running alongside the articulation edge of the flap, this edge being provided with one or more notches opening into the lower face of the firing canal and comprising at least one tether secured to the flap and passing radially through the notch while being held at the external face of the firing canal in order to constitute an articulation of the flap to the instrument panel body.

6. The arrangement as claimed in claim 5, in which the edge of the firing canal that runs alongside the articulation edge of the flap comprises at least two notches, and a tether that locally forms a loop passing radially through the firing canal at two notches while being held by the external face portion of the firing canal that is situated between these two notches so as to constitute an articulation of the flap to the instrument panel body.

\* \* \* \* \*